United States Patent [19]

Jensen et al.

[11] Patent Number: 4,620,446
[45] Date of Patent: Nov. 4, 1986

[54] ACCELERATION RESPONSIVE TRANSDUCERS

[75] Inventors: Jorgen Jensen, Gentofle, Denmark; Gregory C. Michel, Framingham, Mass.

[73] Assignee: Bruel & Kjaer Instruments, Inc., Marlborough, Mass.

[21] Appl. No.: 687,943

[22] Filed: Dec. 31, 1984

[51] Int. Cl.$^4$ ............................................. G01H 1/00
[52] U.S. Cl. ..................................... 73/652; 73/1 DV
[58] Field of Search ................. 73/652, 649, 654, 658, 73/661, 660, 1 DV; 310/329; 367/13

[56] References Cited

U.S. PATENT DOCUMENTS

| | | | |
|---|---|---|---|
| 3,076,343 | 2/1963 | Dumas et al. | 367/13 |
| 3,120,622 | 2/1964 | Dranetz et al. | 73/652 |
| 3,566,163 | 2/1971 | Fischer et al. | 310/329 |
| 4,441,044 | 4/1984 | Ruckenbauer et al. | 310/329 |
| 4,503,351 | 3/1985 | Sonderegger et al. | 310/329 |

*Primary Examiner*—Stephen A. Kreitman
*Attorney, Agent, or Firm*—Schiller & Pandiscio

[57] ABSTRACT

An improved vibration-responsive device is provided for monitoring the condition of a selected apparatus. The improved device is adapted to be mounted to the selected apparatus and comprises a vibration-responsive transducer capable of generating an electrical output signal when the transducer is subjected to vibrations or shock, an auxiliary transducer capable of producing mechanical vibrations in response to an input electrical signal, and means mounting said auxiliary transducer in force-transmitting relation to the vibration-responsive transducer. The device is adapted to be connected to (1) a monitoring system for monitoring the electrical output of the vibration-responsive transducer (the "primary transducer") and (2) means for selectively energizing the auxiliary transducer with an externally generated test signal. When the auxiliary transducer is energized by the test signal, it will cause the associated primary transducer to vibrate. That in turn should cause a corresponding change in the signal output of the primary transducer if the latter is operating correctly. If the signal output of the primary transducer does not change when the auxiliary transducer is energized by the test signal, the interrogating party may validly conclude that the primary transducer is malfunctioning. The invention contemplates several ways of arranging the auxiliary transducer in force-transmitting relation to the primary transducer. Preferably the auxiliary transducer is disposed between the primary transducer and its mounting base. Alternatively the auxiliary transducer is clamped between the mounting base of the primary transducer and the surface to which the base is mounted. In an alternative embodiment, the primary and auxiliary transducers share common piezoelectric elements.

22 Claims, 5 Drawing Figures

ACCELERATION RESPONSIVE TRANSDUCERS

INTRODUCTION

This invention relates to vibration-sensing transducers and more particularly to means for monitoring the sensitivity and/or operability of vibration-sensing transducers from remote positions.

THE PRIOR ART

Systems for monitoring or gathering data frequently involve the use of one or more vibration-sensing transducers, i.e., accelerometers, located at remote points for monitoring the operation of one or more devices and means for recovering the data developed by the transducers at those points. For the measurement of static and dynamic mechanical forces, electromechanical force-gauges are frequently utilized. In such gauges a change in electrical charge, voltage, current, or impedance is brought on by the forces to be measured.

Accelerometers, in which the acceleration of a seismic mass results in a mechanical force proportional to the acceleration are well known. The said force acts on a transducing element, e.g. a pressure-sensitive electrical resistor or semi-conductor or a piezo-electric element, resp. an electrodynamic system or any other known system for the conversion of mechanical energy into electrical energy.

Accelerometers and other vibration-sensing transducers are commonly used in different environments for monitoring the operation of dynamic equipment, e.g., turbines, pumps, solenoid valves, motors, and like devices. In the case of turbines it is desirable to monitor operation so as to be able to sense when a malfunction occurs or is about to occur. If a turbine blade commences to come loose or shows a tendency to deform or starts to disintegrate, the frequency of vibration of the turbine in which the blade is moving will change. This change in frequency can be detected by an accelerometer and used to emit a warning signal to shut down the turbine before the blade separates from the rotor or disintegrates or otherwise causes damage to the turbine. Accelerometers also are used to check on dynamic imbalances of turbine rotors in large power plants and jet engines, faulty operation of pumps, deenergization of electric motors, etc. Systems employing accelerometer-type transducers for monitoring or gathering data from selected equipment typically involve recorders and monitors located at one or more remote points for recording and monitoring the data output signals from the transducers. Such systems may have means for generating an alarm signal whenever a data signal departs from a predetermined norm, and may include computers for displaying and/or processing the data output signals for review by persons skilled in interpreting such data.

Various forms of accelerometers are known. Piezoelectric (PZ) accelerometers are most common. PZ accelerometers are available in various designs, including but not limited to the following: (a) basic compression, (b) isolated compression, (c) single ended compression, (d) Bender design, (e) annular shear, (f) Delta shear, and (g) planar shear. In this connection see H. N. Norton, Handbook of Transducers for Electronic Measuring Systems, pp. 93-105, Prentice Hall (1969) and Bruel & Kjaer Catalog, pp. 145-162, (1983). In each case the PZ accelerometer comprises one or more piezoelectric disks which are top or side loaded by one or more seismic masses and are held in position by one or more stiff springs. The PZ accelerometer generates an electrical output proportional to the force on the PZ disk(s), and the force is a function of the (a) the seismic mass, which is preloaded by a spring or springs, and (b) the acceleration. For frequencies from very near DC up to approximately one-third of the resonant frequency of the accelerometer device, the acceleration of the seismic mass is equal to the acceleration of the whole transducer. Consequentially the charge produced by the piezoelectric element(s) is proportional to the acceleration to which the transducer device is subjected. This charge can be measured electronically at the output terminal of the accelerometer device and used for accurate determination of the vibration amplitude, frequency and waveform.

Other forms of accelerometers that are used in data gathering systems include but are not limited to those which use strain gages or vibrating elements, or those which utilize photoelectric transduction, reluctive transduction or capacitive transduction (see Norton, supra, pp. 105-117). PZ accelerometers are preferred for most remote location applications where temperature is the most critical environmental condition since PZ accelerometers have been designed for use over wider temperature ranges than any other type of accelerometer. PZ accelerometers also have other advantages known to persons skilled in the art. Accelerometers for remote location applications are made to stringent specifications.

Despite the best manufacturing techniques, it is possible to have a transducer which is faulty or is susceptible to failure or faulty operation under changing ambient conditions. Thus, for example, a PZ accelerometer may be made with an imperfect coupling between the PZ crystal and the large and small masses. If the contact is not perfect, the resonant frequency output of the transducer may shift to a higher or lower frequency. Also a transducer (whether of the PZ or other type) may fail in service for reasons other than imperfect manufacture, e.g., abuse in service, improper installation, etc.

All such transducers are initially calibrated. Once calibrated, the transducer can be tested in relation to its calibration characteristics to determine whether or not it is functioning properly.

Heretofore such testing of a transducer for operability was accomplished by (a) bringing test equipment to the transducer installation site and testing it there, or (b) removing the transducer from its installation site and testing it off-site. In both cases, real time monitoring of the operability of the transducer was impractical or impossible.

Because of the rapidity with which data signals are generated, and also because a typical data-gathering system comprises a plurality of transducers disposed at a number of remote and/or frequently hard to reach locations, it is desirable to be able to determine selectively if any of a plurality of remote accelerometers is malfunctioning, and to monitor the operability of such transducers without having to have a technician go to their points of installation to test them.

OBJECTS AND SUMMARY OF THE INVENTION

Accordingly, the primary object of this invention is to provide a new and improved vibration-sensing transducer unit which is capable of being tested for operability from a remote location.

A further primary object of this invention is to provide a new method of testing vibration-responsive transducers for operability from a local or remote test location.

Another object of this invention is to provide new and improved accelerometer-type transducer devices which can be monitored and tested for operability from a remote location and without having to remove it from its installation site or disturbing its circuit connections.

Still another object of this invention is to provide a new and improved PZ transducer for measuring the operation of dynamic devices, said new and improved transducer being adapted to be tested and monitored for operability by a remote monitoring system.

A further object of this invention is to provide a novel method of monitoring and testing a PZ transducer located at a remote or relatively inaccessible site without having to disturb said transducer.

These and other objects are achieved in a first form of the invention by (a) mounting an auxiliary piezoelectric transducer in force-transmitting relation to the vibration responsive transducer to be monitored (the "primary transducer") and (b) providing means for selectively energizing the auxiliary transducer with an externally generated test signal. When the auxiliary pZ transducer is energized by the test signal, it will cause the associated primary transducer to vibrate. That in turn should cause a corresponding change in the signal output of the primary transducer if the latter is operating correctly. Thus the signal output of the primary transducer is monitored when the test signal is applied to the auxiliary transducer. If the signal output of the primary transducer does not change when the auxiliary transducer is energized by the test signal, the interrogating party may validly conclude that the primary transducer is malfunctioning. The first form of the invention contemplates the use of either compression or shear mode PZ accelerometers as the primary transducer and different ways of arranging the auxiliary transducer in force-transmitting relation to the primary transducer. Preferably the auxiliary transducer is disposed between the primary transducer and its mounting base. Alternatively the auxiliary transducer is clamped between the mounting base of the primary transducer and the surface to which the base is mounted.

In a second form of the invention, the primary transducer is a Delta shear mode accelerometer that is modified so as to also function as the auxiliary transducer.

Other features and many of the attendant advantages of the invention are disclosed or rendered obvious from the following detailed description which is to be considered together with the accompanying drawings.

THE DRAWINGS

In the drawings, like numerals refer to like parts.

DETAILED DESCRIPTION OF PREFERRED EMBODIMENT

Figure 1:
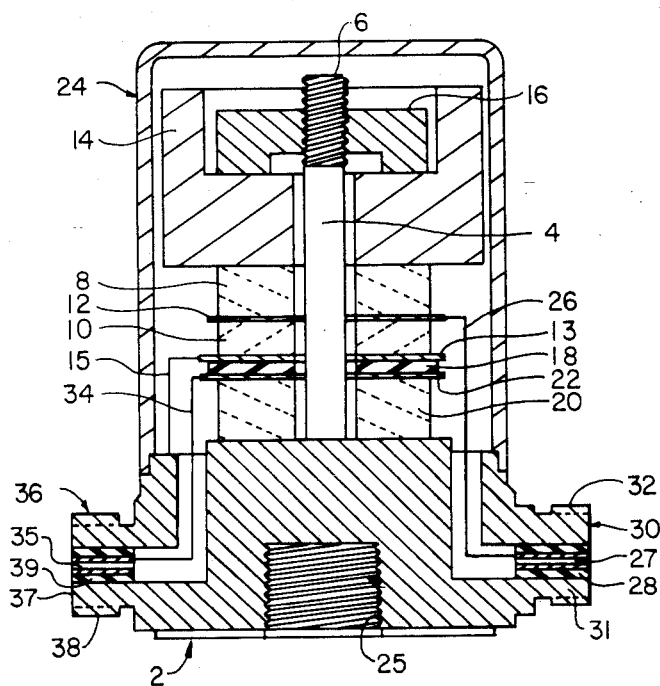
FIG. 1 illustrates a preferred embodiment of the invention.

FIG. 1 illustrates a single-ended compression mode accelerometer modified in accordance with the present invention. The illustrated device comprises a metal base 2, a metal center post 4 integral with base 2 and having a screw thread 6 at its free end, a pair of annular piezoelectric disks 8 and 10 coupled together by a common electrode 12 and ground electrode 13, a seismic mass 14, a spring in the form of a dish-shaped annulus 16 which is screwed onto post 4, an annular insulating disk 18, a piezoelectric disk 20, an electrode 22 for piezoelectric disk 20, and a metal housing or cover 24 which is secured to base 2. PZ disks 8, 10 and 20 are all cut so as to function as compression mode trannsducer elements. A threaded hole 25 in the bottom of base 2 is used to receive a screw for mounting the base to a surface of an apparatus which is to be monitored, e.g., a compressor or pump housing (not shown). Cover 24 is attached to base 2 by welding or a press fit or by other suitable means. Cover 24 is sized so as not to physically engage any of the above-described elements other than base 2.

Electrode 12 is connected by a wire lead 26 to the hollow metal center post 27 of a coaxial output socket terminal 30 which includes an outer sleeve 31 that is formed as an integral hollow side extension of base 2. The interior of the socket terminal is filled with a suitable insulation material 28 which surrounds and supports center post 27. Socket sleeve 31 is externally threaded as shown at 32 for attachment of a connector on a coaxial cable for coupling PZ elements 8 and 10 to an external monitoring or measuring circuit. Electrode 13 is connected to base 2 by a wire lead 15.

Electrode 22 is connected by a wire lead 34 to the hollow center post 35 of a coaxial input socket terminal 36 which includes an outer sleeve 37 that is formed as a hollow side extension of base 2. Socket terminal 36 is externally threaded as shown at 38 for attachment of a connector on a coaxial cable for coupling the auxiliary transducer to a testing circuit. Socket terminal 36 also is lined with an insulator 39 between center post 35 and sleeve 37.

Base 2, PZ disks 8 and 10, electrodes 12 and 13, seismic mass 14, and spring 16 constitute the primary PZ transducer, while PZ disk 20, its electrode 22 and base 2 constitute the auxiliary transducer provided according to this invention.

Annular spring 16 compresses the seismic mass in a direction to clamp the three PZ elements and the electrodes between it and base 2. The clamping force is such as to (a) permit PZ elements 8 and 10 to generate an output signal when the whole assembly is vibrated, and (b) permit PZ element 20 to expand and contract and thereby cause vibration of main elements 8 and 10 when element 20 is energized with an oscillating signal.

Figure 2:
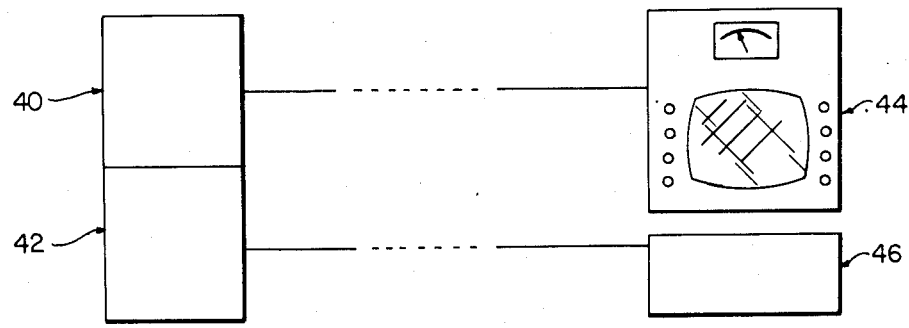
FIG. 2 is a circuit diagram illustrating a transducer monitoring system embodying the preferred embodiment of the invention.

FIG. 2 illustrates how the device of FIG. 1 is employed. In FIG. 2, the main PZ transducer comprising elements 8 and 10 is represented at 40 and the auxiliary transducer comprising element 20 is represented at 42. The main transducer is connected to a monitor 44, while the auxiliary transducer is connected to an excitation source 46. The monitor may be of any suitable type, e.g., a type 2505 Multipurpose Monitor made by Bruel & Kjaer Instruments, Inc. of Marlborough, Mass., U.S.A., adapted to provide continuous monitoring of signals produced by one or more accelerometers and to generate warning and/or machinery shutdown or switchover signals in the event that an accelerometer output signal shows that equipment being monitored has failed or its failure is imminent. The monitor is adapted to measure vibration levels at one or more selected frequencies and to determine when the vibration levels exceed predetermined limits. The excitation source 46 is a signal generator of suitable design, e.g., a sine wave generator, which is capable of being turned on as required, e.g., periodically or selectively, by operator command or automatically by the monitor or other equipment, e.g., a computer. Although excitation source 46 is shown as a separate unit in FIG. 2, it is to be appreciated that it may be a signal generator which is built into the monitor.

Still referring to FIG. 2, the excitation source 46 may be activated at any time. When it is activated, it excites the auxiliary PZ transducer element 20, causing the latter to expand and contract in accordance with the frequency of the signal. Since the auxiliary transducer is clamped to the primary transducer, its expansion and contraction, i.e., its vibrations, will cause the primary transducer to vibrate at the same frequency. If the primary transducer is operative, the induced vibration of the primary transducer will be reflected by an oscillatory change in its output signal. This output signal may be analyzed by monitor 38 to determine how the primary transducer is functioning and to provide an output that indicates whether or not the primary transducer is functioning properly.

Alternatively the monitor may be set to simply provide a display of the frequency response of the primary transducer for evaluation by a human operator. For example, the monitor may determine that the frequency response of the primary transducer has shifted, e.g., because of aging or other deterioration, sufficiently to require replacement of the transducer or a compensating adjustment of the filter circuits of the monitor. On the other hand, the lack of any output from the primary transducer when the auxiliary transducer is excited will be a positive indication that the primary transducer has failed and must be replaced.

The system shown in FIGS. 1 and 2 is particularly advantageous in the case where the accelerometer is attached to equipment which is frequently quiescent, e.g., a pump in an oil or gas pipeline or an electric motor in a ship. In such cases, failure of the monitor to detect an oscillatory output signal from the primary transducer may be because of (a) failure of the primary transducer or (b) shutdown of the equipment being monitored. By using the auxiliary transducer to excite the primary transducer, it is possible to determine positively that the primary transducer is operative and that its failure to produce an oscillatory signal when the auxiliary transducer is not activated is due to shutdown of the monitored equipment.

It is to be appreciated that the monitor may include means for providing an audible indication or display when the primary transducer fails to produce a suitable output signal in response to excitation of the auxiliary transducer.

ALTERNATIVE EMBODIMENTS

Figure 3:
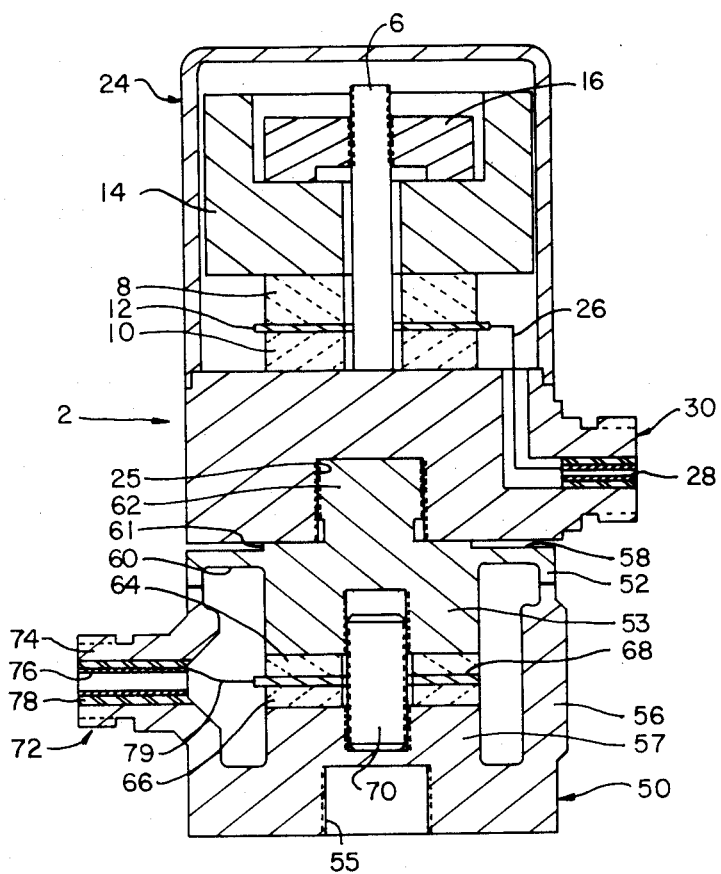
FIGS. 3, 4 and 5 illustrate alternative embodiments of the invention.

FIG. 3 illustrates an alternative embodiment of the invention. While the primary transducer may embody various designs, in this particular case the primary transducer is a compression mode PZ accelerometer that is the same as the primary transducer of FIG. 1 except that (a) ground electrode 13 and insulator 18 are omitted, and (b) base 2 has only one coaxial socket terminal.

In the embodiment of FIG. 3 the auxiliary transducer is a conventional PZ type force transducer 50 which is mechanically coupled to the primary transducer by a screw connection, as described hereinafter. By way of example, force transducer 50 may be a type 8200 force transducer produced by Bruel & Kjaer of Marlboro, Mass., U.S.A. Transducer 50 has a housing made from two separately formed parts 52 and 56 that are welded together at their mating surfaces 51. The interiors of housing parts 52 and 56 are sculpted so as to form two aligned mesa or center post sections 53 and 57 that are integral extensions of their end walls. Disposed between the flat end surfaces of mesa sections 53 and 57 are two annular PZ disks 64 and 66 separated by an annular metal electrode 68. A preloading screw 70 screwed into threaded holes in mesa sections 53 and 57 serves to control the extent to which PZ disks 64 and 66 and electrode 68 are compressed between the two mesa sections when the PZ disks are not subjected to an applied electric field. The PZ disks 64 and 66 and electrode 68 all have an inside diameter large enough so as not to contact preloading screw 70.

The upper section 52 of the force transducer housing is formed with a thin wall side wall section 59 and its end wall 58 has a thin annular wall section 60 that is integral with side wall section 59. Wall sections 59 and 60 have thicknesses such as to enable the end wall of housing section 52 and mesa section 53 to flex axially of the housing when PZ disks 64 and 66 are electrically charged by an oscillating electrical signal.

The force transducer has a coaxial socket terminal 72 comprising a hollow sleeve 74 formed as a side extension of housing section 52 and a hollow center post 76 which is mounted by insulating material 78 within sleeve 74. Electrode 68 is connected to hollow post 76 by a wire lead 79.

The lower part 56 of the force transducer housing has a threaded hole 55 whereby it can be attached to a mounting surface. The end wall of the upper housing section 52 has a raised shoulder portion 61 and a projecting threaded center spigot 62 that is screwed into the threaded hole 25 in base 2 of the primary transducer far enough for shoulder portion 61 to tightly engage the bottom surface of base 2, whereby the primary transducer will move when the upper wall of the force transducer housing is flexed axially.

The device of FIG. 3 is used and functions in the same manner as the device of FIG. 1, except that in this case when an oscillating electrical signal is applied via a cable connected to coaxial terminal 72, an oscillating electric charge is applied to PZ elements 64 and 66, and the oscillating stresses set up in the PZ elements cause the end wall 58 to vibrate as a consequence of the reduced stiffness of the thin wall sections of housing part 56. The vibrations of end wall 58 are transmitted via shoulder 61 and spigot 62 to the base 2 of the primary transducer, thereby causing vibration of the primary PZ elements 8 and 10 and seismic mass 14, and the consequent generation of an output signal at terminal 30 of the primary transducer if the latter device has not been rendered inoperative, e.g., by a mechanical defect or an electrical malfunction.

Figure 4:
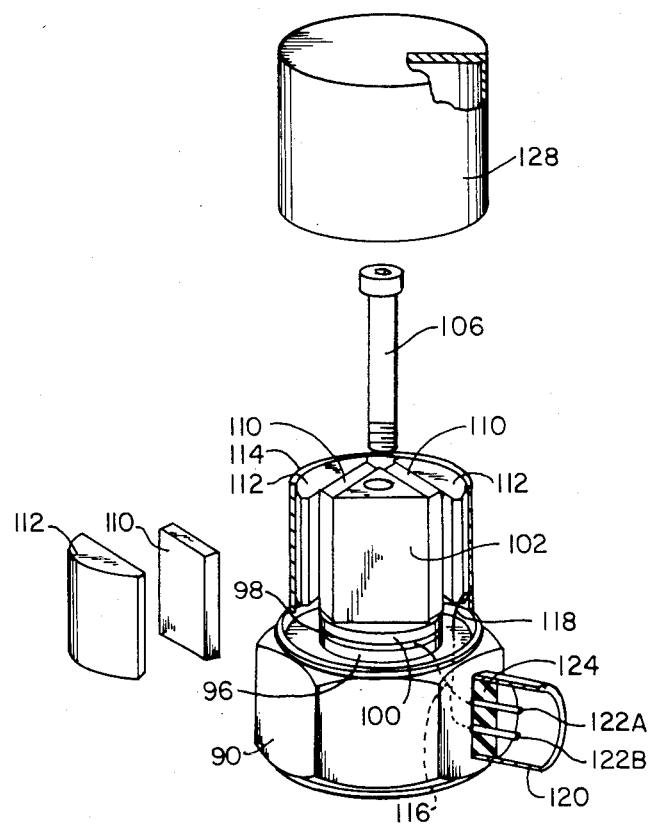

FIG. 4 shows the invention as applied to a shear mode accelerometer. In this case the accelerometer comprises a base 90. Supported on base 90 is an auxiliary compression mode PZ transducer comprising an annular flat PZ element 96 cut for compression mode vibration, an annular flat metal electrode 98 attached to PZ element 96, and an annular flat insulator disk 100. Supported on insulator disk 100 is a triangularly shaped metal post 102 which supports the operating elements of the primary transducer that constitutes the accelerometer. The post 102 has a center hole to accommodate a screw 106 that screws into a threaded hole (not shown) in base 90. Screw 106 is applied so that the auxiliary transducer elements are clamped between base 90 and post 102. The center holes in PZ element 96, electrode 98 and insulator disk 100 are aligned and sized so that screw 106 does not engage them.

The operating elements of the accelerometer or primary transducer section of the device of FIG. 4 comprise three shear mode PZ elements 110, three seismic masses 112 each engaging one of the PZ elements, and a cylindrical metal sleeve 114 surrounding the PZ elements and the seismic masses. The PZ elements 110 are flat wafers and they engage the three flat side surfaces of post 102. The seismic masses 112 have flat inner surfaces that engage the confronting flat sides of the PZ elements and circularly curved outer surfaces that are engaged by the inner surface of cylindrical sleeve 114. The latter is sized so that it tightly engages the seismic masses and acts through them to clamp the PZ elements against the flat sides of post 102. Sleeve 114 is made so that its bottom end (as seen in FIG. 4) is spaced from base 90 at all times. Two lead wires 116 and 118 connect the electrode 98 of the auxiliary transducer and the sleeve 114 of the primary transducer to a dual socket terminal 120. The latter is constructed identically to socket terminal 30 except that it has two hollow terminal posts 122A and 122B similar to socket post 27. Posts 122A and 122B are mounted in an insulating matrix 124 similar to insulator 28. Lead wire 116 connects auxiliary transducer electrode 98 to terminal post 122A. Lead wire 118 connects sleeve 114 to terminal post 122B. A housing cover 128 fits over the operating elements of the device and is secured to base 90 in a suitable way, e.g., by welding, brazing or a cement, or by screwing it to the base. The cover does not contact screw 106, PZ wafers 110, seismic masses 112, or sleeve 114.

The embodiment of FIG. 4 is connected to an excitation and monitoring circuit similar to the one shown in FIG. 2 by means of a suitable cable having dual pin connectors at its opposite ends for connection to (a) the hollow posts 122A and 122B of terminal 120 and (b) a terminal (not shown) that is connected to excitation source 46 and monitor 44. The embodiment of FIG. 4 functions in the same way as the embodiment of FIG. 1, except that the accelerometer or primary transducer of FIG. 4 functions in the shear vibration mode. In this connection it is to be noted that the operating circuit for the auxiliary transducer comprises contact post 122A, wire lead 116, electrode 98, PZ element 96, and base 90. The operating circuit for the primary shear mode transducer comprises contact post 122B, wire lead 118, sleeve 114, and three parallel paths each comprising a seismic mass 112, a PZ element 110, post 102, screw 106, and base 90. When an oscillating signal is applied to the auxiliary transducer via base 90 and contact post 122A of socket terminal 120, the PZ element 96 of the auxiliary transducer is excited and alternately is stressed and unstressed, causing the primary transducer, i.e., the accelerometer, to vibrate, with the result that the three PZ elements 110 undergo shear mode vibration and thereby produce output signals that are added and appear across base 90 and terminal post 122B of terminal 120. By using a monitoring system as shown in FIG. 2, it is possible to determine from the characteristics of the output signal appearing at terminal post 122B, or by the absence of a signal, whether or not the accelerometer is functioning correctly.

Figure 5:
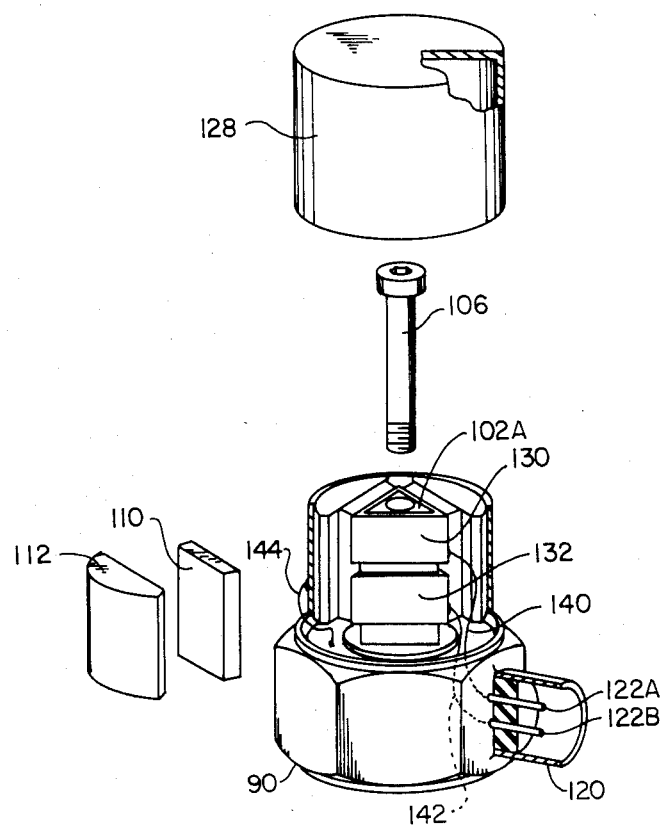

FIG. 5 shows a different way to apply the invention to a shear mode accelerometer. In this case the primary and auxiliary transducers share the same PZ elements. This device again comprises a base 90, three shear mode PZ elements 110, three seismic masses 112 each engaging one of the PZ elements, and a cylindrical metal sleeve 114 surrounding the PZ elements and the seismic masses. The PZ elements 110 are flat wafers and the seismic masses 112 have flat inner surfaces that engage the confronting flat sides of the PZ elements and circularly curved outer surfaces that are engaged by the inner surface of metal sleeve 114.

The device of FIG. 5 utilizes a post 102A that is identical to post 102 except that (a) it is made of a ceramic material, (b) it is plated with two separate conductive metal bands or electrodes 130 and 132 that are spaced from one another, and (c) it directly engages base 90. Bands 130 and 132 extend completely around the post. As explained hereinafter in greater detail, metal band 130 functions as part of the auxiliary transducer and metal band 132 functions as part of the primary transducer. The PZ elements 110 engage those portions of bands 130 and 132 that cover the flat surfaces of post 102A, and sleeve 114 is sized so that it tightly engages the seismic masses and acts through them to clamp the PZ elements against the metal bands on the flat sides of post 102A. As in the device of FIG. 4, sleeve 114 is made so that its bottom end (as seen in FIG. 5) is spaced from base 90 at all times. Also sleeve 114 does not engage post 102A, screw 106 or any of the components carried by post 102A. Base 90 again has a contact terminal 120 having two hollow contact posts 122A and 122B. A lead wire 140 connects the auxiliary transducer electrode 130 to terminal post 122A. A second lead wire 142 connects the primary transducer electrode 132 to terminal post 122B. A third lead wire 144 connects sleeve 114 to base 90. Housing cover 128 fits over the operating elements of the device and is secured to base 90 in a suitable way, e.g., by welding, brazing or a cement, or by screwing it to the base.

Like the embodiment of FIG. 4, the device shown in FIG. 5 is connected to an excitation and monitoring circuit similar to the one shown in FIG. 2 by means of a suitable cable having dual pin connectors at its opposite ends for connection to (a) the hollow posts 122A and 122B of terminal 120 and (b) a terminal (not shown) that is connected to excitation source 46 and monitor 44, whereby to couple terminal post 122A to excitation source 46 and couple terminal post 122B to monitor 46. The embodiment of FIG. 5 is similar to that of FIG. 4 in that the primary transducer functions in the shear vibration mode, but differs in that the auxiliary transducer functions in the same mode, and the auxiliary and primary transducers share the same PZ elements. In this connection it is to be noted that the auxiliary transducer comprises comprises terminal post 122A, wire lead 140, metal electrode 130, the three PZ elements 110, the three seismic masses 112, the metal sleeve 114, wire lead 144, and base 90, while the primary transducer comprises terminal post 122B, wire lead 142, metal electrode 132, the three PZ elements 110, the three seismic masses 112, the metal sleeve 114, wire lead 144, and base 90.

Assume that an oscillating signal is applied to the auxiliary transducer via base 90 and contact post 122B of socket terminal 120. In such event, the three PZ elements 110 will be excited and alternately stressed and unstressed, causing the associated elements of the accelerometer, i.e., seismic masses 112 and sleeve 114, to vibrate in a shear mode relative to the PZ elements. Assuming that the oscillating exciting signal is of relatively short duration, e.g., 0.5 to 2.0 seconds, and that it occurs when the monitor 44 is active, the vibration of the seismic masses and sleeve 114 in the shear mode will cause the PZ elements to generate output signals that are added and appear across base 90 and contact post 122B of terminal 120. Consequently the monitoring system of FIG. 2 will be able to determine from the characteristics of the output signal appearing at terminal post 122B, or by the absence of a signal, whether or not the primary transducer, i.e., the accelerometer, is functioning or, if functioning, whether it is operating correctly.

It is to be understood that the present invention is not limited to the specific forms shown in FIGS. 1 and 3–5. Thus the embodiment of FIG. 1 may be modified by using a shear mode PZ transducer as the auxiliary transducer. The primary transducer also may be some other kind of vibration-sensing device, e.g., a capacitive or strain gage vibration-sensing transducer. Also the auxiliary transducer may be mechanically coupled to the primary transducer by some other arrangement. Still other modifications will be obvious to persons skilled in the art. As used in the foregoing specification and the following claims, the term "PZ" means "piezoelectric".

What is claimed is:

1. A device for monitoring the condition of a selected apparatus comrpising:
   a base;
   a primary piezoelectric transducer capable of generating an output electrical signal in response to mechanical vibrations of said selected apparatus;
   an auxiliary piezoelectric transducer capable of generating mechanical vibrations in response to an electrical input signal;
   said primary and auxiliary transducers being characterized by PZ elements that form part of both said primary and auxiliary transducers;
   means including a separately formed fastener member attached to said base for mounting said primary and auxiliary piezoelectric transducers to said base;
   first and second terminal means carried by said base;
   first connecting means for providing an electrical connection between said first terminal means and said auxiliary piezoelectric transducer; and
   second connecting means for providing an electrical connection between said second terminal means and said primary piezoelectric transducer;
   said primary and auxiliary transducers being arranged so that when said auxiliary piezoelectric transducer is caused to vibrate as a consequence of application of an electrical input signal to said first terminal means, the mechanical vibrations of said auxiliary piezoelectric transducer will be imparted to said primary piezoelectric transducer so as to cause said primary piezoelectric transducer to generate an output electrical signal at said second terminal means if said primary piezoelectric transducer is operative.

2. A device according to claim 1 wherein said primary transducer comprises at least one piezoelectric element that is shear sensitive.

3. A device according to claim 1 wherein said PZ elements are adapted for shear mode vibration, and further wherein said PZ elements are mounted so that the shear mode axis of vibration of one element is parallel to the shear mode axis of vibration of the other elements.

4. A device according to claim 1 having a ceramic post attached to said base, and further wherein said PZ elements are attached to said post.

5. A device for monitoring the condition of a selected apparatus comprising:
   a base;
   a primary piezoelectric transducer capable of generating an output electrical signal in response to mechanical vibrations of said selected apparatus;
   an auxiliary piezoelectric transducer capable of generating mechanical vibrations in response to an electrical input signal;
   said primary and auxiliary transducer comprising an electrically non-conducting post attached to said base, a pair of mutually spaced metal electrodes on said post, at least one shear mode PZ element supported by said post in engagement with said electrodes, at least one seismic mass supported by said post in engagement with said at least one shear mode PZ element, first and second terminal means carried by said base, first connecting means for providing an electrical connection between said first terminal means and said auxiliary piezoelectric transducer, and second connecting means for providing an electrical connection between said second terminal means and said primary piezoelectric transducer,
   said first connecting means being connected to one of said electrodes so that application of a varying electrical potential to said first terminal means will cause said at least one PZ element to be stressed and unstressed, and said second connecting means being connected to the other of said electrodes so that the electrical potential produced by said at least one PZ element when said at least one PZ element is stressed and unstressed may be sensed at said second terminal means.

6. A device for monitoring the condition of a selected apparatus comprising:
   a housing comprising a base and a cover;
   a post attached to said base;
   an auxiliary compression mode transducer capable of generating mechanical vibrations in response to an electrical input signal, said auxiliary transducer comprising at least one PZ element in engagement with said base, said at least one PZ element having an aperture formed in the center thereof and being mounted so that said post extends through said aperture;
   a primary compression mode transducer capable of generating an output electrical signal in response to mechanical vibrations of said selected apparatus, said primary transducer engaging said auxiliary transducer and comprising at least two PZ elements each having an aperture formed in the center thereof, said PZ elements being mounted so that said post extends through the said apertures thereof;
   a seismic mass engaging said primary transducer, said mass having an aperture formed in the center thereof and being mounted so that said post extends through its said aperture;
   spring means attached to said post, said spring means being mounted so as to resiliently urge said seismic mass toward said base, whereby said primary and auxiliary transducers are held together between said base and said mass; and a cover attached to said base and surrounding said transducer, said seismic mass, and said spring means;

said primary and auxiliary transducers being arranged so that when mechanical vibrations are generated as a consequence of application of an electrical input signal to said auxiliary transducer, said mechanical vibrations will be imparted to said primary transducer so as to cause said primary transducer to generate said output electrical signal if said primary transducer is operative.

7. A device according to claim 6 wherein said base has terminal means for coupling said primary and auxiliary transducers to monitoring and exciting means respectively.

8. A device according to claim 6 further including insulating means interposed between said primary and auxiliary transducers for electrically insulating said at least one PZ element of said auxiliary transducer from said at least two PZ elements of said primary transducer.

9. A device according to claim 8 wherein said primary and auxiliary transducers have mutally confronting electrodes and said insulating means comprises a disk disposed between and engaged by said mutually confronting electrodes.

10. A device according to claim 8 further wherein said base is made of metal and forms part of the electrical circuit of each of said primary and auxiliary transducers.

11. A device for monitoring the condition of a selected apparatus comprising:
a base;
a post;
a primary transducer comprising at least one shear mode PZ element capable of generating an output electrical signal in response to mechanical vibrations of said selected apparatus, said primary transducer element being supported by said post so as to be in engagement therewith;
an auxiliary transducer comprising at least one compression mode PZ element capable of generating mechanical vibrations in response to an electrical input signal, said auxiliary transducer being mounted between said base and said post so that said element engages said base and said post engages said element;
at least one seismic mass supported by said post in engagement with said at least one primary transducer element; and
means for holding said seismic mass in engagement with said post;
said primary and auxiliary transducer being arranged so that when mechanical vibrations are generated as a consequence of application of an electrical input signal to said auxiliary transducer, said mechanical vibrations will be imparted to said primary transducer so as to cause said primary transducer to generate said output electrical signal if said primary transducer is operative.

12. A device according to claim 11 further comprising: means for applying a varying electrical potential to said at least one auxiliary transducer element so as to cause said element to be stressed and unstressed; and means for sensing the electrical potential produced by said at least one primary transducer element when said at least one auxiliary transducer element is stressed and unstressed.

13. A device according to claim 11 comprising a cover surrounding said post, said transducer, and said seismic mass, said cover being attached to said base.

14. A device according to claim 11 wherein said primary transducer comprises a plurality of shear mode PZ elements, said plurality being supported by said post in engagement therewith so that the shear mode axis of vibration of one element is parallel to the shear mode axis of vibration of the other elements.

15. A device for monitoring the condition of a selected apparatus comprising:
a primary transducer capable of generating an output electrical signal in response to mechanical vibrations of said selected apparatus;
an auxiliary transducer capable of generating mechanical vibrations in response to an electrical input signal;
said primary and auxiliary transducers being arranged so that when mechanical vibrations are generated as a consequence of application of an electrical input signal to said auxiliary transducer, said mechanical vibrations will be imparted to said primary transducer so as to cause said primary transducer to generate said output electrical signal if said primary transducer is operative;
said device comprising at least one shear mode PZ element that forms part of both said primary and auxiliary transducers.

16. A device for monitoring the condition of a selected apparatus comprising a base, a primary transducer capable of generating an output electrical signal in response to mechanical vibrations of said selected apparatus, and an auxiliary transducer capable of generating mechanical vibrations in response to an electrical input signal, said primary and auxiliary transducers comprising an electrically non-conducting post attached to said base, a pair of mutually spaced metal electrodes on said post, at least one shear mode PZ element that forms part of both said primary and auxiliary transducers, said at least one shear mode PZ element being supported by said post in engagement with said electrodes, at least one seismic mass supported by said post in engagement with said at least one PZ element, means for applying a varying electrical potential to one of said electrodes so as to cause said at least one PZ element to be stressed and unstressed, and means coupled to the other of said electrodes for sensing the electrical potential produced by said at least one PZ element when said at least one PZ element is stressed and unstressed.

17. A device according to claim 16 wherein said primary and auxiliary transducers comprise in common a plurality of shear mode PZ elements, said plurality being supported by said post in engagement with said electrodes so that the shear mode axis of vibration of one element is parallel to the shear mode axis of vibration of the other elements.

18. A device according to claim 17 further including means surrounding said transducers for holding said shear mode PZ elements in engagement with said electrodes.

19. A device according to claim 18 wherein said post has a plurality of flat side surfaces, and further wherein each of said side surfaces is engaged by a shear mode PZ element.

20. A device according to claim 19 comprising three mutually spaced shear mode PZ elements disposed about said post and three seismic masses each engaging a different one of said PZ elements.

21. A device according to claim 20 wherein said post has three mutually spaced flat surfaces disposed about its axis, and further wherein each of said flat surfaces is covered by corresponding portions of said pair of electrodes.

22. A device according to claim 17 including a cover surrounding said transducers, said post, and said at least one seismic mass, said cover being attached to said base.

* * * * *

UNITED STATES PATENT AND TRADEMARK OFFICE
CERTIFICATE OF CORRECTION

PATENT NO. : 4620446
DATED : November 4, 1986
INVENTOR(S) : Jorgen Jensen et al

It is certified that error appears in the above-identified patent and that said Letters Patent is hereby corrected as shown below:

Claim 6, column 11, line 4, the word "transducer" should be -- transducers --; and Claim 13, column 12, line 4, the word "transducer" should be -- transducers --.

Signed and Sealed this

Seventeenth Day of February, 1987

*Attest:*

DONALD J. QUIGG

*Attesting Officer*  *Commissioner of Patents and Trademarks*